(12) United States Patent
Loftsgard et al.

(10) Patent No.: US 10,163,364 B2
(45) Date of Patent: Dec. 25, 2018

(54) METHOD OF PROVIDING FEEDBACK FOR A PIECE OF CUE SPORT EQUIPMENT DURING GAME PLAY

(71) Applicants: Paul Loftsgard, San Diego, CA (US); Andrey Dolgov, San Diego, CA (US); Petras Avizonis, San Diego, CA (US); Johann Ammerlahn, San Diego, CA (US)

(72) Inventors: Paul Loftsgard, San Diego, CA (US); Andrey Dolgov, San Diego, CA (US); Petras Avizonis, San Diego, CA (US); Johann Ammerlahn, San Diego, CA (US)

( * ) Notice: Subject to any disclaimer, the term of this patent is extended or adjusted under 35 U.S.C. 154(b) by 18 days.

(21) Appl. No.: 15/582,238

(22) Filed: Apr. 28, 2017

(65) Prior Publication Data
US 2017/0312570 A1 Nov. 2, 2017

Related U.S. Application Data

(60) Provisional application No. 62/329,058, filed on Apr. 28, 2016.

(51) Int. Cl.
| | |
|---|---|
| *A63D 15/00* | (2006.01) |
| *G09B 19/00* | (2006.01) |
| *G01L 5/00* | (2006.01) |
| *A63B 43/00* | (2006.01) |
| *A63B 71/06* | (2006.01) |
| *G01P 15/08* | (2006.01) |

(52) U.S. Cl.
CPC ........ *G09B 19/0038* (2013.01); *A63B 43/004* (2013.01); *A63B 71/0619* (2013.01); *A63D 15/006* (2013.01); *G01L 5/0052* (2013.01); *A63B 2220/40* (2013.01); *A63B 2220/53* (2013.01); *A63B 2220/802* (2013.01); *A63B 2220/833* (2013.01); *A63B 2225/50* (2013.01); *A63B 2243/002* (2013.01); *G01P 15/08* (2013.01)

(58) Field of Classification Search
CPC . A63B 53/14; A63B 2220/40; A63B 2225/50; A63B 2102/18; A63B 15/005; A63B 69/3685; A63B 24/0003; A63B 53/0466; A63B 71/0622; A63B 53/00; G01R 33/02; G01C 21/12; G06K 9/00342
USPC ........ 473/44–53, 224, 223; 463/36; 702/153
See application file for complete search history.

(56) References Cited

U.S. PATENT DOCUMENTS

| | | | | |
|---|---|---|---|---|
| 2006/0166738 | A1* | 7/2006 | Eyestone | A63B 15/005 463/36 |
| 2012/0277018 | A1* | 11/2012 | Boyd | A63B 24/0003 473/224 |

(Continued)

*Primary Examiner* — Mitra Aryanpour

(57) ABSTRACT

A method of providing feedback for a piece of cue-sport equipment, a cue ball or cue stick, during a game play first collect spatial positioning and orientation data from a plurality of measurement sensors that is integrated into the cue-sport equipment. Then, the collected data is analyzed to generate a virtual movement model of the cue-sport equipment as the virtual movement model includes a calculated impact force diagram, an animated travel path, and a calculated absolute orientation for the cue-sport equipment. Then, the player can view the virtual movement model through an external computing device to improve their cue-sport skills effectively and efficiently.

17 Claims, 14 Drawing Sheets

(56) References Cited

U.S. PATENT DOCUMENTS

2014/0357392 A1* 12/2014 Goel ................. G06K 9/00342
473/223
2015/0362331 A1* 12/2015 Sanchez ................. G01R 33/02
702/153

* cited by examiner

US 10,163,364 B2

METHOD OF PROVIDING FEEDBACK FOR A PIECE OF CUE SPORT EQUIPMENT DURING GAME PLAY

The current application claims a priority to the U.S. Provisional Patent application Ser. No. 62/329,058 filed on Apr. 28, 2016.

FIELD OF THE INVENTION

The present invention is related to information gathering. More specifically, the present invention is a method of enhancing a piece of cue sport equipment with sensors and other related electronic devices in order to gather data on performance aspects of game play and to provide feedback to operator via an external computing device.

BACKGROUND OF THE INVENTION

The cue sport requires considerable skill, precision, technique, and strategy in order for an individual to be respectable player. Training to become proficient is lengthy and time-consuming process, often because it is difficult to gather feedback on how well and repeatably a stroke was executed, and to determine the dynamic behind the observed results (ball velocity, spin, angle, etc.). Existing training methods are not optimized to make use of the trainee's performance data and thus may be expensive (an expert may be required), limited (books or similar sources), or non-interactive (videos and audios). In addition, current cue sport games have a limited number of avenues for comparing and ranking performance, limiting the number and variety of games that may be played.

It is therefore an objective of the present invention to provide a method that provides feedback for a piece of cue sport equipment during game play. More specifically, the present invention gathers data through a plurality of measurement sensors and a processor that are integrated into cue sport equipment such as cue ball or cue stick. The present invention then further analyses the collected data in order to generate a virtual movement model, a force diagram, and an absolute orientation for the cue sport equipment during the game play. Then, the results of the present invention are displayed to the player through an external computing device, allowing the player to improve their cue spot skills effectively and efficiently.

DETAIL DESCRIPTIONS OF THE INVENTION

All illustrations of the drawings are for the purpose of describing selected versions of the present invention and are not intended to limit the scope of the present invention.

Figure 1:
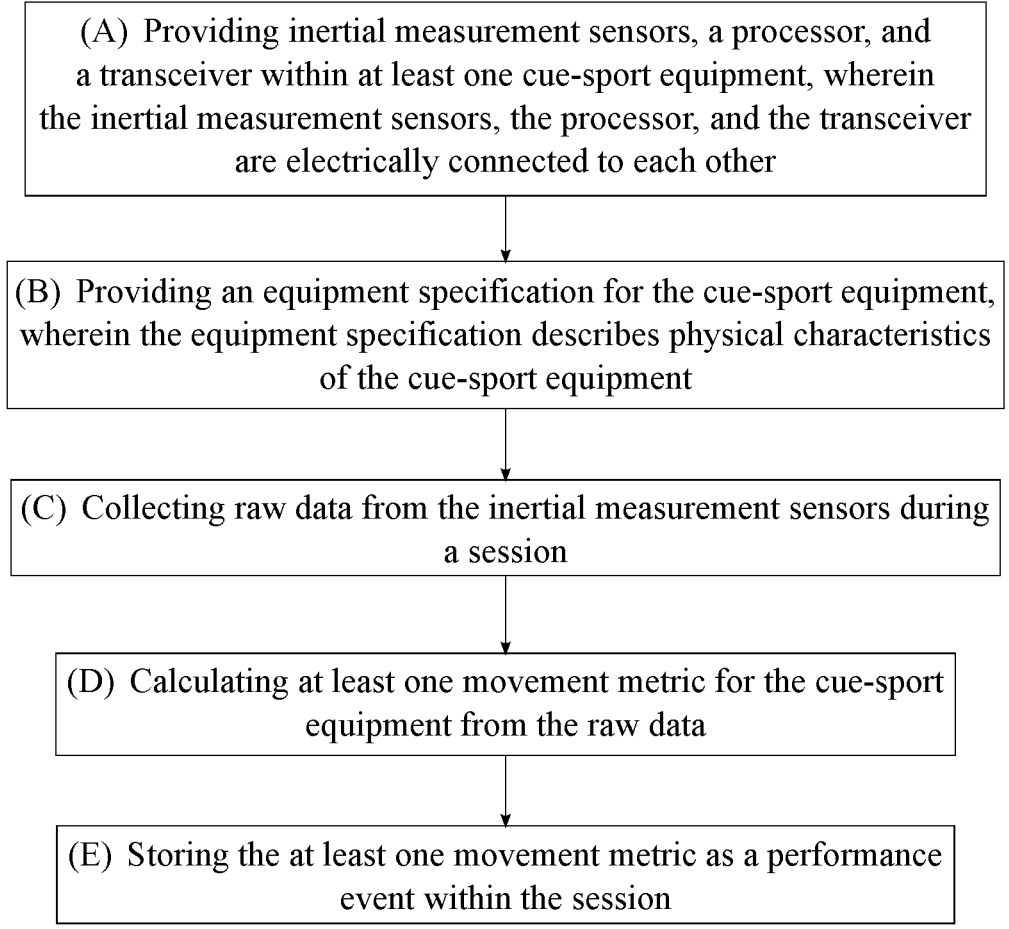
FIG. 1 is a flow chart of the general process of the present invention.

The present invention is a system and a software application that provide feedback for a piece of cue-sport equipment during usage. More specifically, the present invention collects and processes data on performance aspects of play through a plurality of embedded sensors and provides feedback to an operator via an external computing device. As can be seen in FIG. 1, the system components of the present invention include inertial measurement sensors, a processor, a transceiver, and at least one cue-sport equipment. For the proper functionality of the present invention, the inertial measurement sensors, the processor, and the transceiver are electrically connected to each other and integrated within the cue-sport equipment. Depending upon the given circumstance and user preferences, the cue-sport equipment can be a billiard ball or a cue stick within the present invention so that the billiard ball or cue stick can initiate a general process of the present invention. However, the cue-sport equipment can also be both the billiard ball and the cue stick, wherein the both the billiard ball and the cue stick mutually initiate the present invention.

Figure 2:
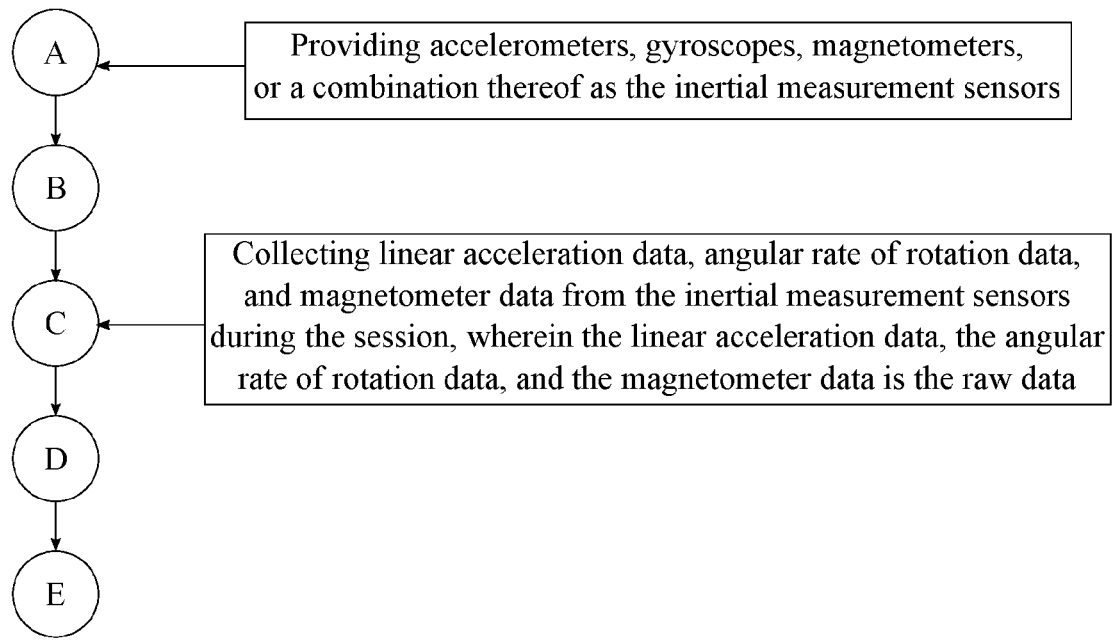
FIG. 2 is a flow chart of the general process of the present invention and the arrangement of the inertial measurement sensors and collected raw data.

As can be seen in FIG. 1-2, the present invention follows the general process by providing an equipment specifications for the cue-sport equipment that describes the physical characteristics of the cue-sport equipment. For example, the billiard ball specifications can include, but is not limited to, the weight, ball diameter, ball circumference, and any other physical dimensions. Similarly, the cue stick can include, but is not limited to, weight, length, diameter, and aerodynamic parameters. The general process continues by directly collecting raw data from the inertial measurement sensors during a session, wherein the session can be identified as a game session, a practice session, or a time session. For example, the session can be designated as the practice section where the cue-sport equipment is programed to absorb pre-determined number of impacts (ten strokes). Another example, the session is designated with a pre-determined time (twenty minutes). The raw data is used to fully describe the dynamic behavior of the cue-sport equipment during the session. The raw data collected from the inertial measurement sensors is directly used as linear acceleration data, angular rate of rotation data, and magnetometer data from the inertial measurement sensors during the session. In the present invention, the inertial measurement sensors preferably include accelerometers, gyroscopes, magnetometers, or a combination thereof. However, the inertial measurement sensors are not limited only to the accelerometers, the gyroscopes, and the magnetometers as different raw data types require different inertial measurement sensors. For example, the present invention can utilize at least one acoustic sensor within the billiard ball in order to easily differentiate an impact between two billiard balls, an impact between a billiard ball and a cue stick, and an impact between a billiard ball and a side of the table.

Figure 3:
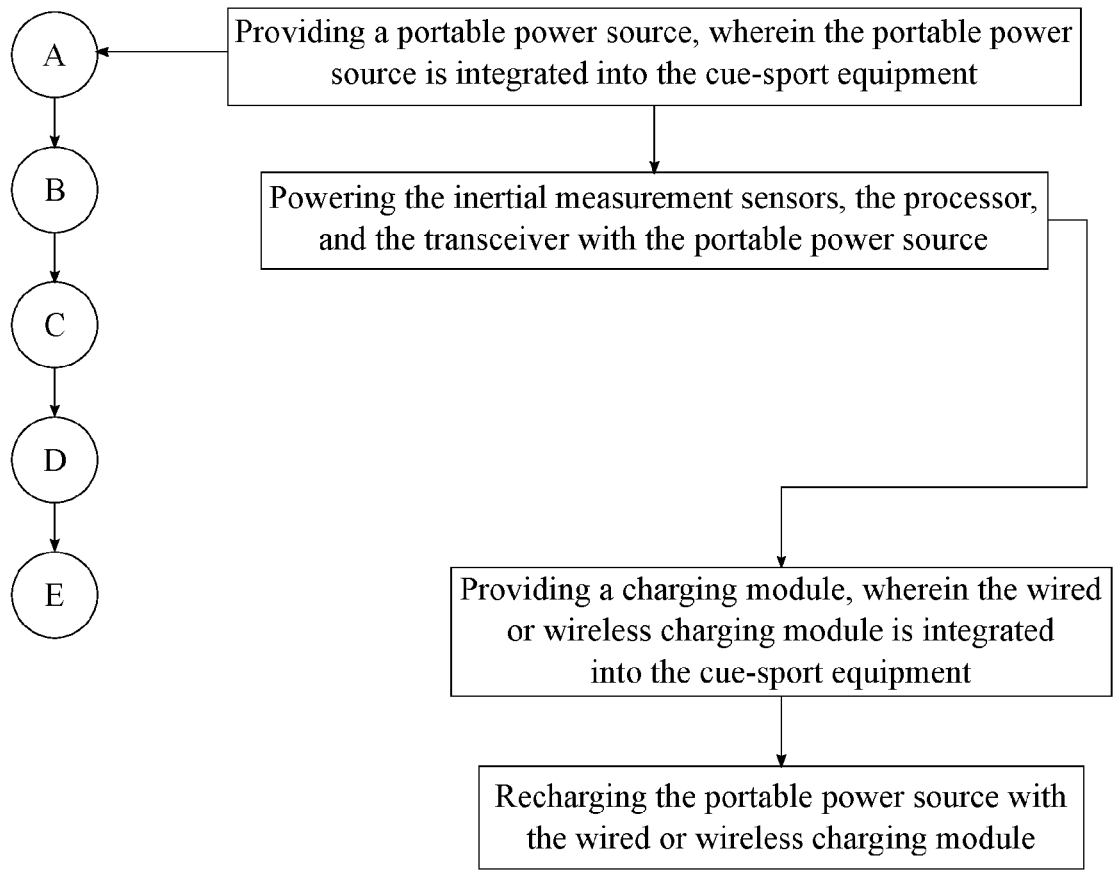
FIG. 3 is a flow chart of the general process of the present invention and arrangement of the portable power source and charging module.

The system components of the present invention are configured to execute the general process efficiently and effectively. In addition to the inertial measurement sensors as shown in FIG. 3, system components that are positioned within the cue-sport equipment include a portable power source. The portable power source, which is integrated into the cue-sport equipment, powers the inertial measurement sensors, the processor, and the transceiver during the session. Since the cue-sport equipment requires range of motion during the session, the present invention utilizes a charging module. The charging module can be wired or wireless module and integrated into the cue-sport equipment so that the charging module can recharge the portable power source within the present invention.

As can be seen in FIG. 1, once the raw data from the inertial measurement sensors are collected, the present invention calculates at least one movement metric for the cue-sport equipment from the collected raw data. The present invention then stores the at least one movement metric as a performance event within the session, wherein further analyses can be executed through the performance event.

Figure 4:
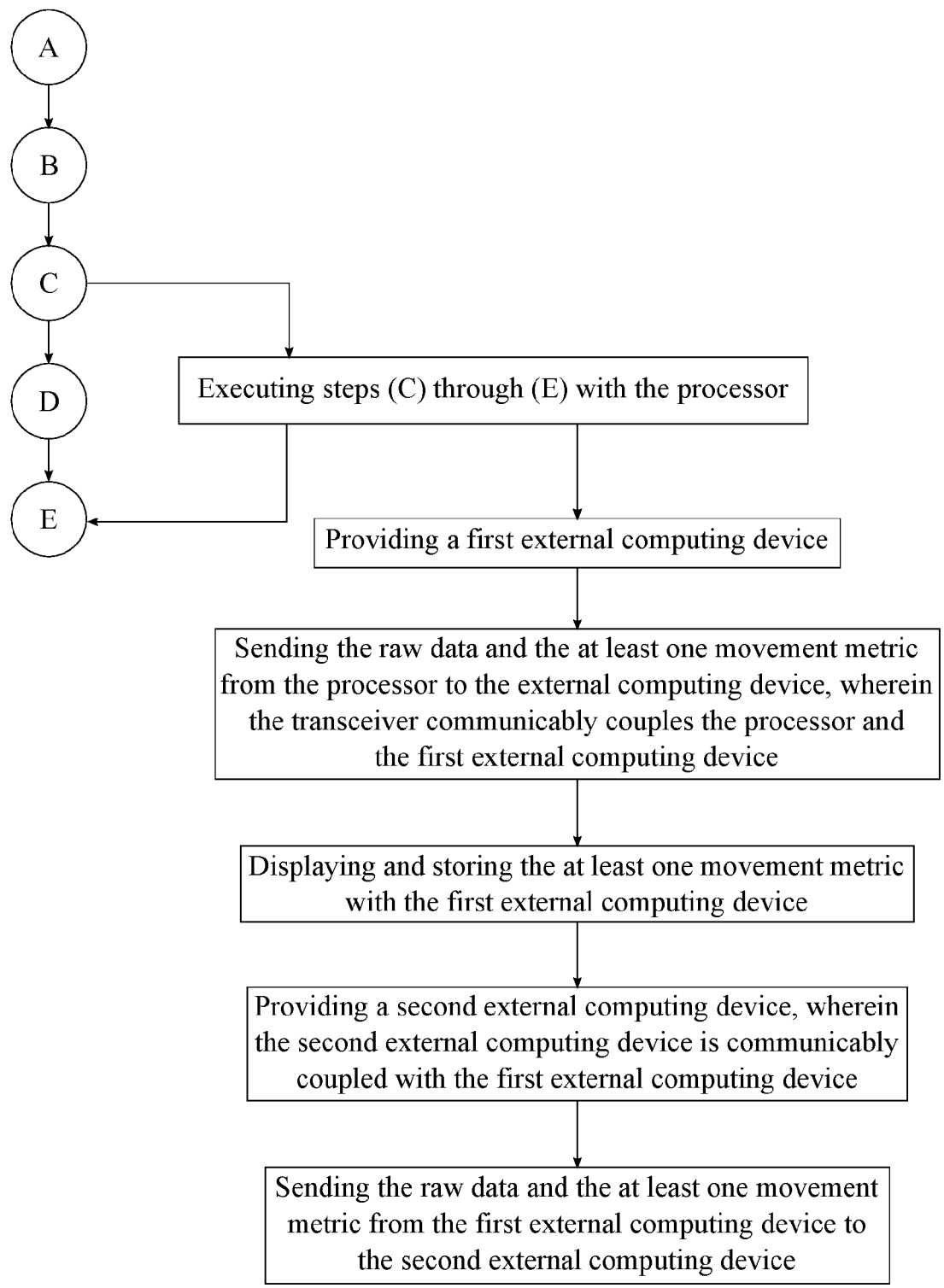
FIG. 4 is a flow chart of the general process of the present invention showing how the processor executes step (C) through (E).

In reference to preferred method, as can be seen in FIG. 4, the processor can collect the raw data from the inertial measurement sensors. Then, the processor calculates the at least one movement metric for the cue-sport equipment so that the at least one movement metric can be stored as the performance event within the processor. Once the operator is ready to view the at least one movement metric through a first external computing device, the transceiver sends the raw data and the at least one movement metric from the processor to the first external computing device as the transceiver is communicably coupled to the processor and the first external computing device. Resultantly, the first external computing device then displays and stores the at least one movement metric. If the operator wishes to forward the raw data and the at least one movement metric to another user, the present invention permits this process as long as a second external computing device is communicably coupled with the first external computing device. More specifically, the raw data and the at least one movement metric are send from the from the first external computing device to the second external computing device through a wireless or wired network connection.

Figure 5:
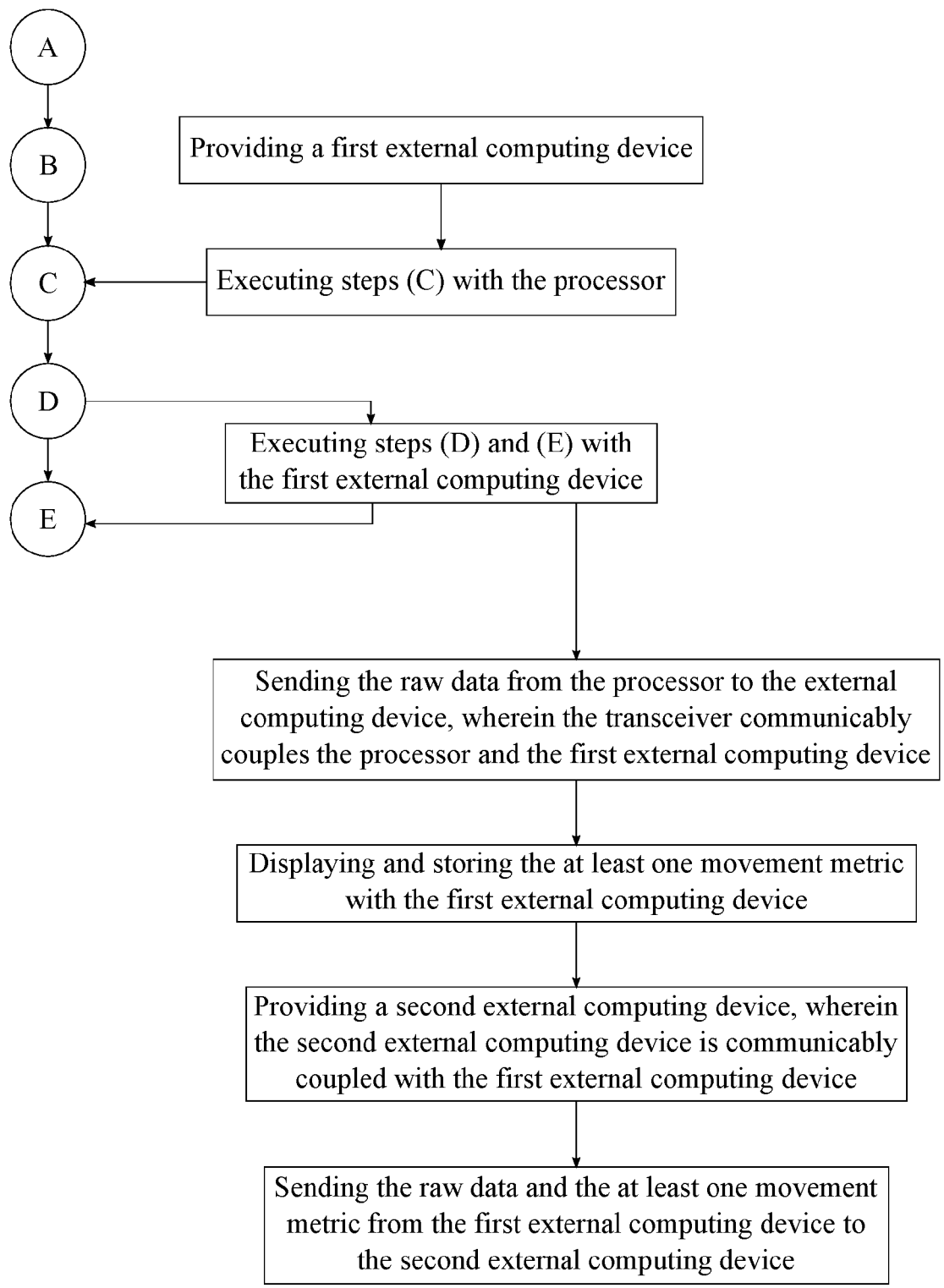
FIG. 5 is a flow chart of the general process of the present invention showing how the processor and the first external computing device executes step (C) through (E).

In reference to another preferred method, as can be seen in FIG. 5, the processor can collect and store the raw data from the inertial measurement sensors. Then, the transceiver sends the raw data from the processor to a first external computing device as the transceiver is communicably coupled to the processor and the first external computing device. The first external computing device then calculates the at least one movement metric for the cue-sport equipment so that the at least one movement metric can be stored as the performance event within the first external computing device. Once the operator is ready to view the at least one movement metric, the first external computing device displays the at least one movement metric. If the operator wishes to forward the raw data and the at least one movement metric to another user, the present invention permits this process as long as a second external computing device is communicably coupled with the first external computing device. More specifically, the raw data and the at least one movement metric are send from the from the first external computing device to the second external computing device through a wireless or wired network connection.

Figure 6:
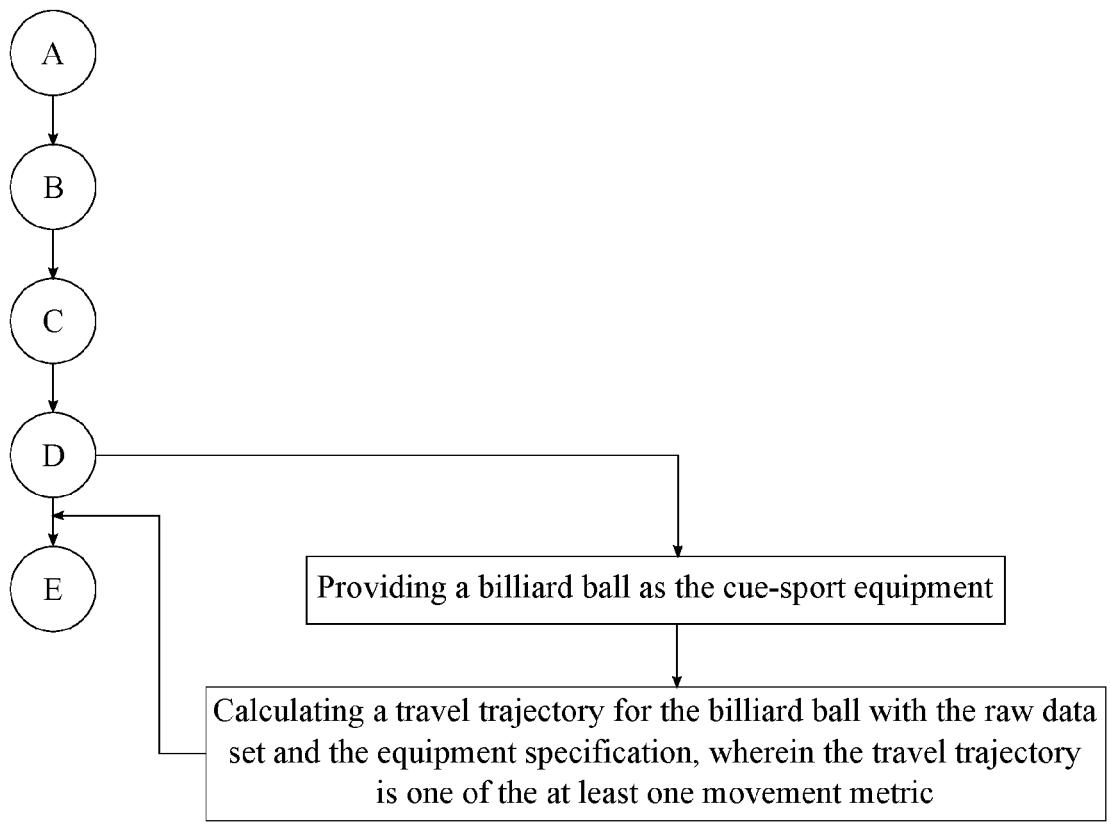
FIG. 6 is a flow chart of the general process of the present invention, showing the process of calculating the travel trajectory for the billiard ball.
Figure 7:
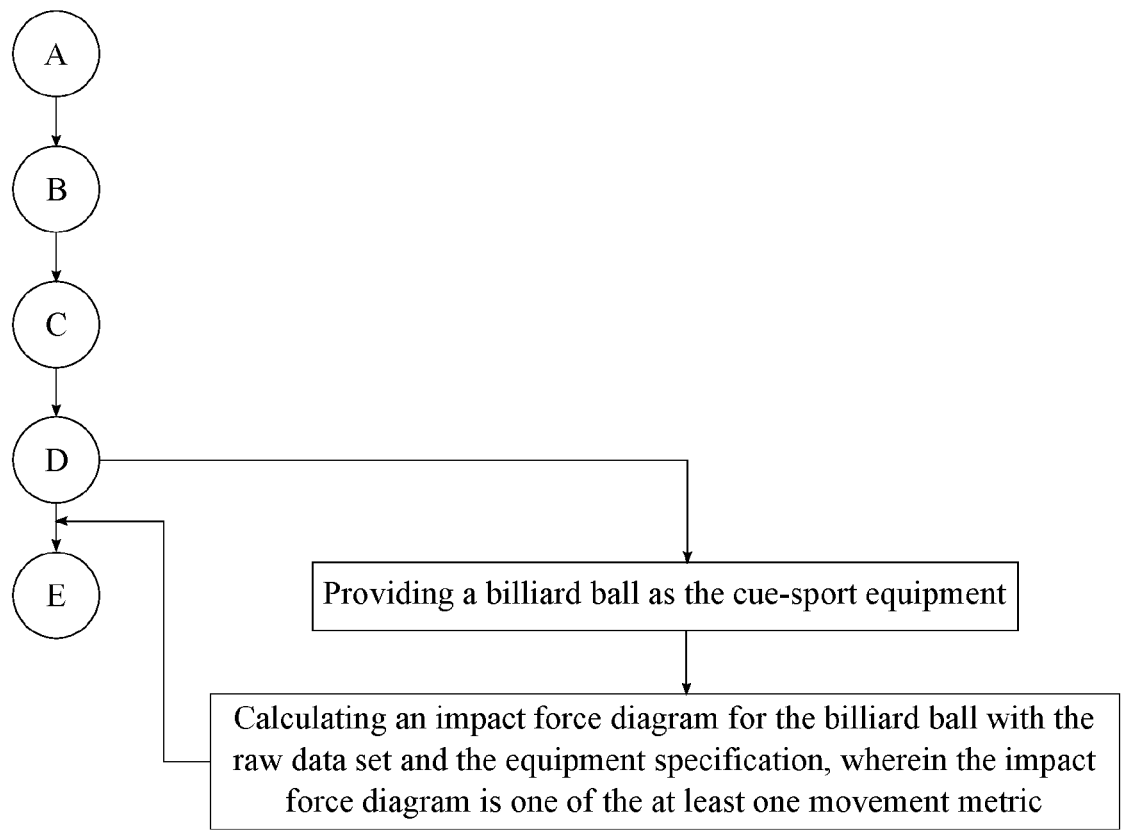
FIG. 7 is a flow chart of the general process of the present invention, showing the process of calculating the impact force diagram for the billiard ball.
Figure 8:
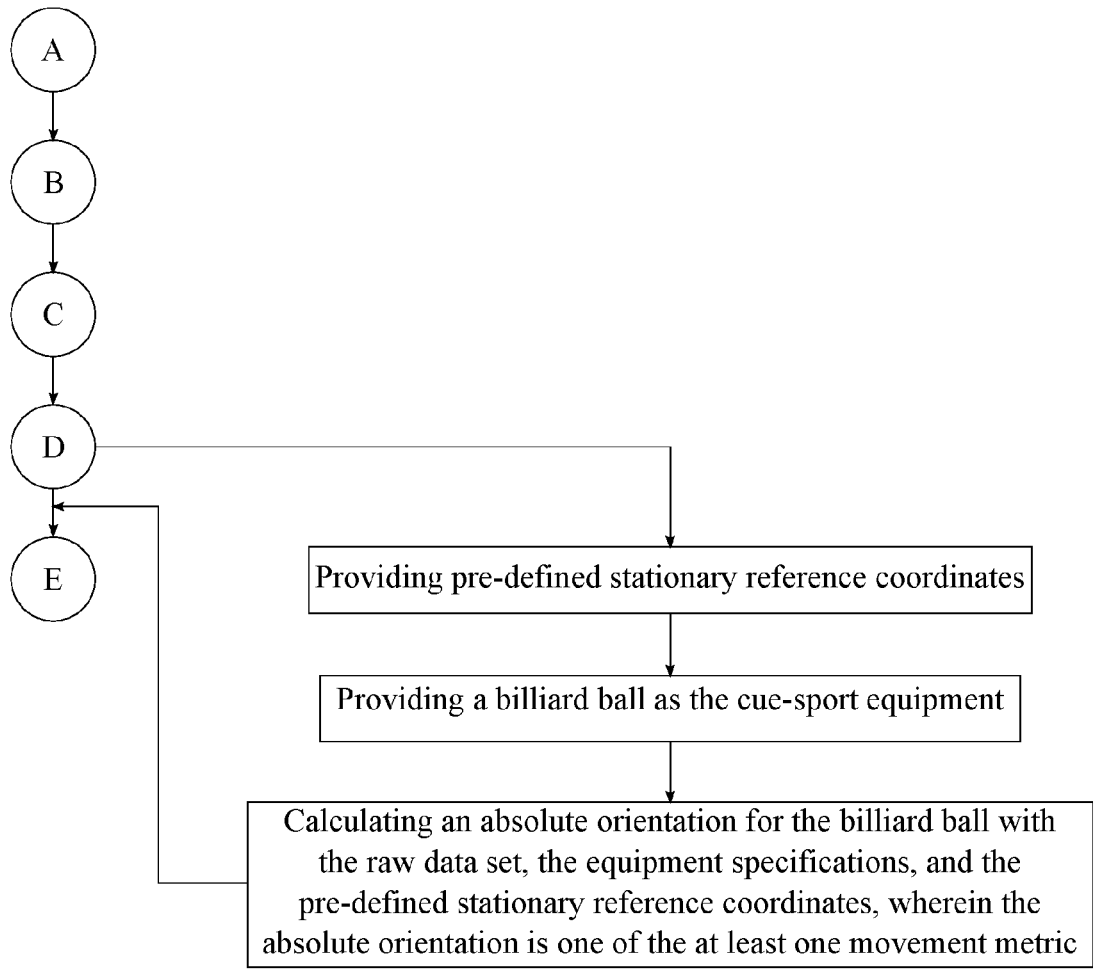
FIG. 8 is a flow chart of the general process of the present invention, showing the process of calculating the absolute orientation for the billiard ball.

As can be seen in FIG. 6-8, when the cue-sport equipment is a billiard ball, the general process of the present invention can calculate an impact force diagram for the billiard ball with the raw data set and the equipment specification. Then, the present invention identifies the impact force diagram as one of the at least one movement metric. For example, the impact force diagram provides information such as, generated linear acceleration for the billiard ball and generated angular rate of rotation for the billiard ball. Resultantly, the operator can repeat, change, modify the billiard ball stroke until desired results accomplished during a practice session. The general process of the present invention can also calculate a travel trajectory for the billiard ball with the raw data set and the equipment specification. Then, the present invention identifies the travel trajectory as one of the at least one movement metric. Since the travel trajectory provides the route of the billiard ball, the operator can visually identify any changes that may involve the billiard ball stroke to improve upon their skills. When the present invention is provided with pre-defined stationary coordinates, the general process of the present invention can calculate an absolute orientation for the billiard ball with the raw data set, the equipment specifications, and the pre-defined stationary reference coordinates. Then, the present invention identifies the absolute orientation as one of the at least one movement metric.

Figure 9:
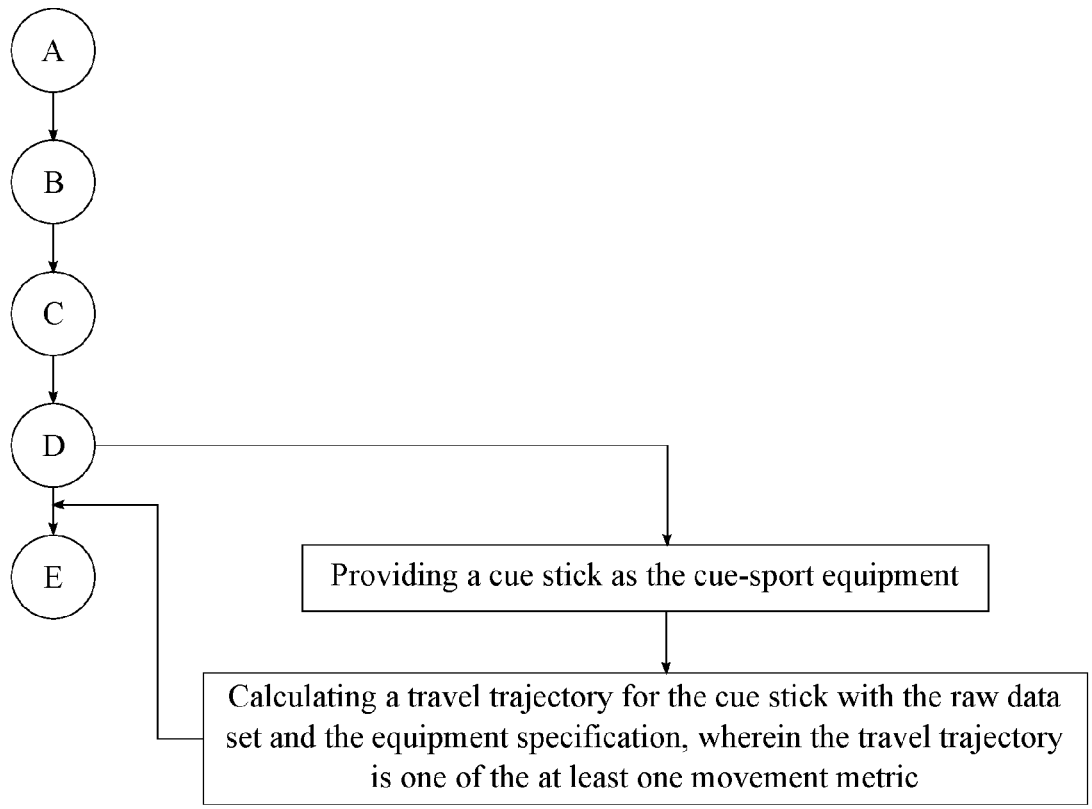
FIG. 9 is a flow chart of the general process of the present invention, showing the process of calculating the travel trajectory for the cue stick.
Figure 10:
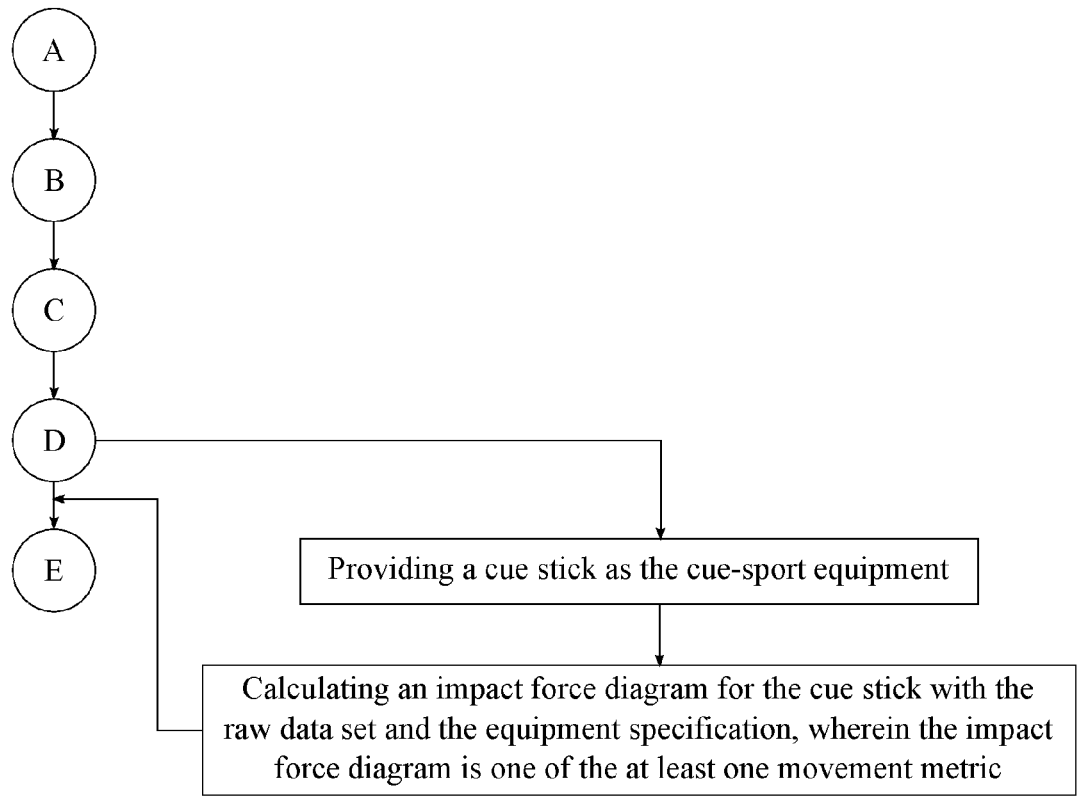
FIG. 10 is a flow chart of the general process of the present invention, showing the process of calculating the impact force diagram for the cue stick.
Figure 11:
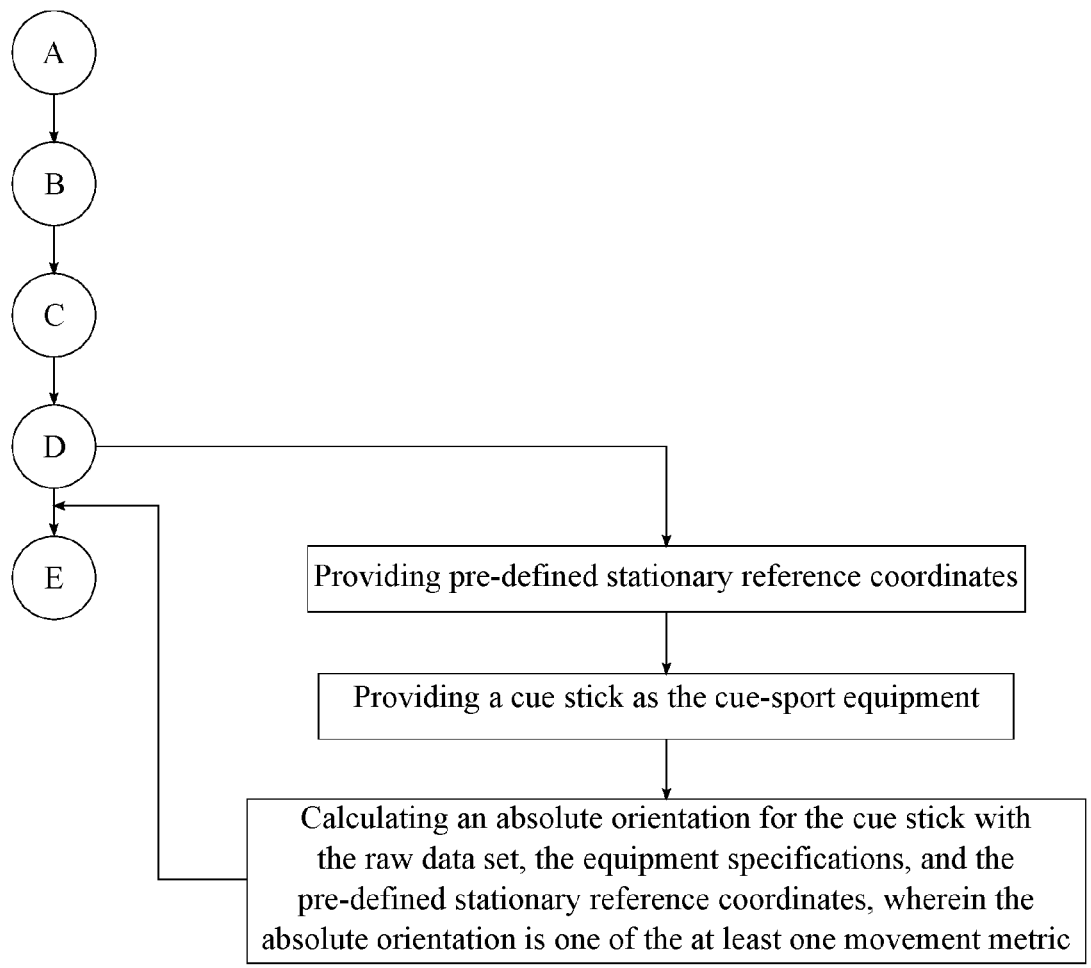
FIG. 11 is a flow chart of the general process of the present invention, showing the process of calculating the absolute orientation for the cue stick.

As can be seen in FIG. 9-11, when the cue-sport equipment is a cue stick, the general process of the present invention can calculate an impact force diagram for the cue stick with the raw data set and the equipment specification. Then, the present invention identifies the impact force diagram as one of the at least one movement metric. For example, the impact force diagram provides information such as, generated linear acceleration for the cue stick and generated angular rate of rotation for the cue stick. Resultantly, the operator can repeat, change, modify the cue stick stroke until desired results are accomplished during a practice session. The general process of the present invention can also calculate a travel trajectory for the cue stick with the raw data set and the equipment specification. Then, the present invention identifies the travel trajectory as one of the at least one movement metric. Since the travel trajectory provides the route of the cue stick, the operator can visually identify any changes that may involve with cue stick stroke to improve upon their skills. When the present invention is provided with pre-defined stationary coordinates, the general process of the present invention can calculate an absolute orientation for the cue stick with the raw data set, the equipment specifications, and the pre-defined stationary reference coordinates. Then, the present invention identifies the absolute orientation as one of the at least one movement metric.

Figure 12:
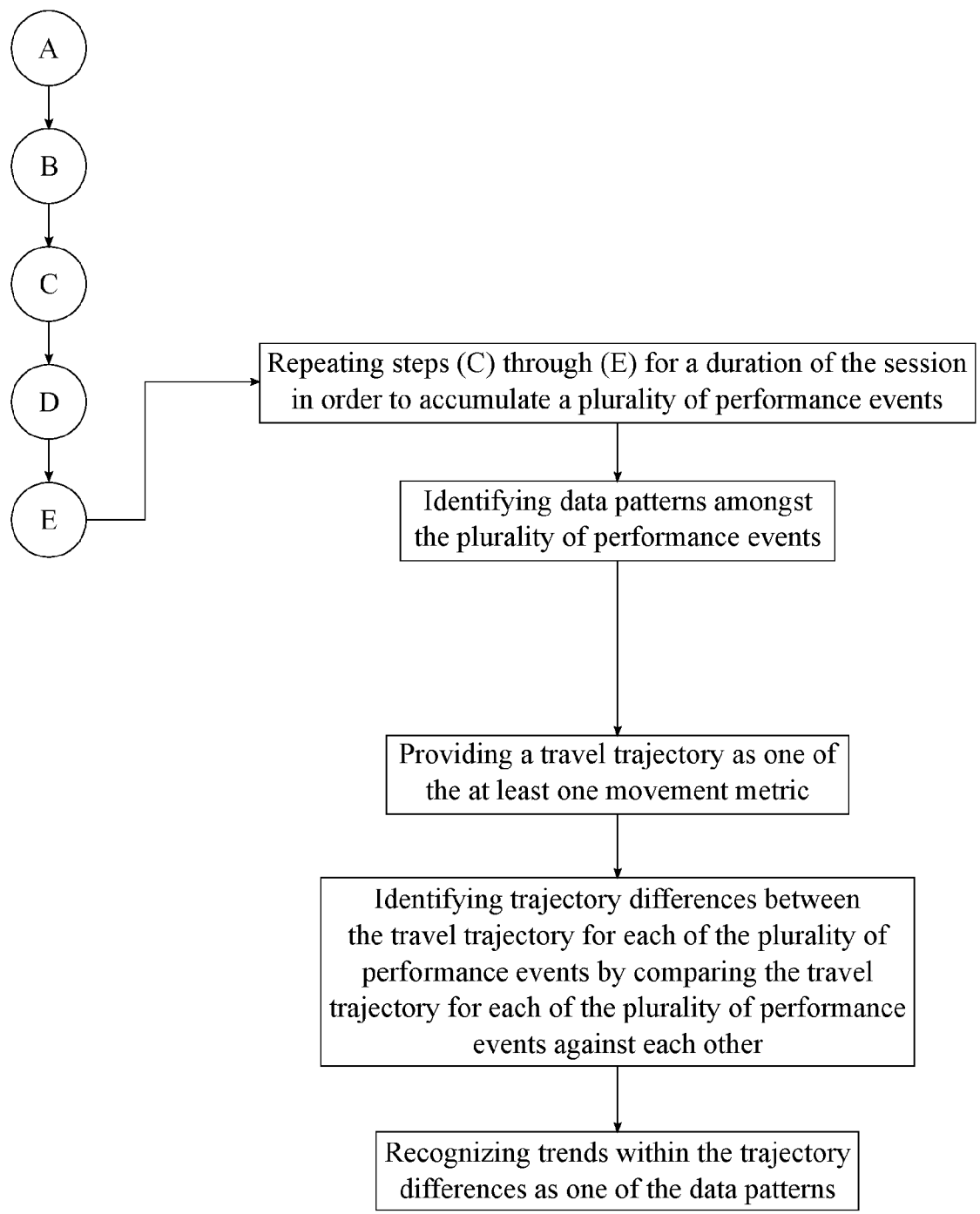
FIG. 12 is a flow chart of the general process of the present invention and identifying data patterns in relation to the trajectory differences.
Figure 13:
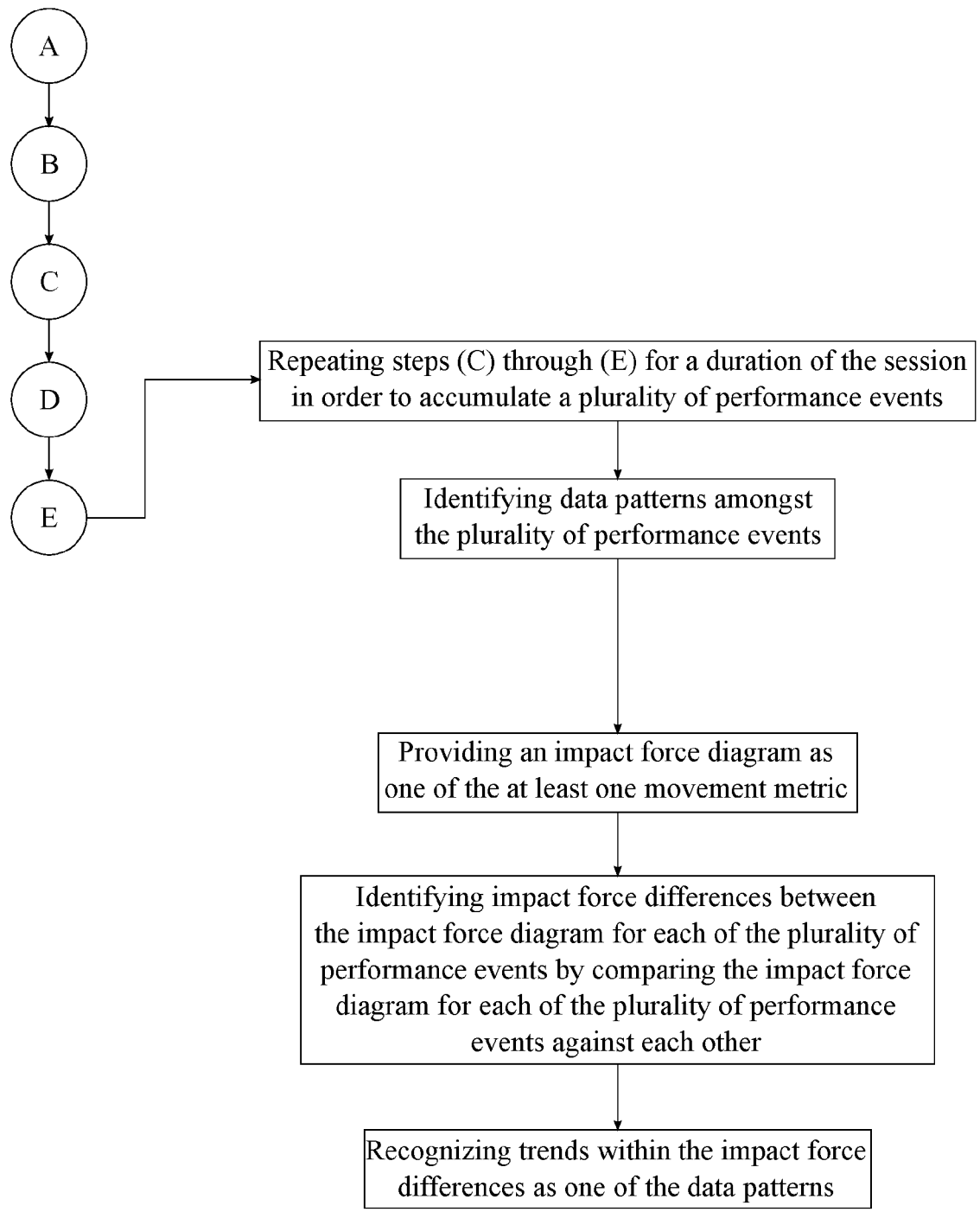
FIG. 13 is a flow chart of the general process of the present invention and identifying data patterns in relation to the impact force differences.
Figure 14:
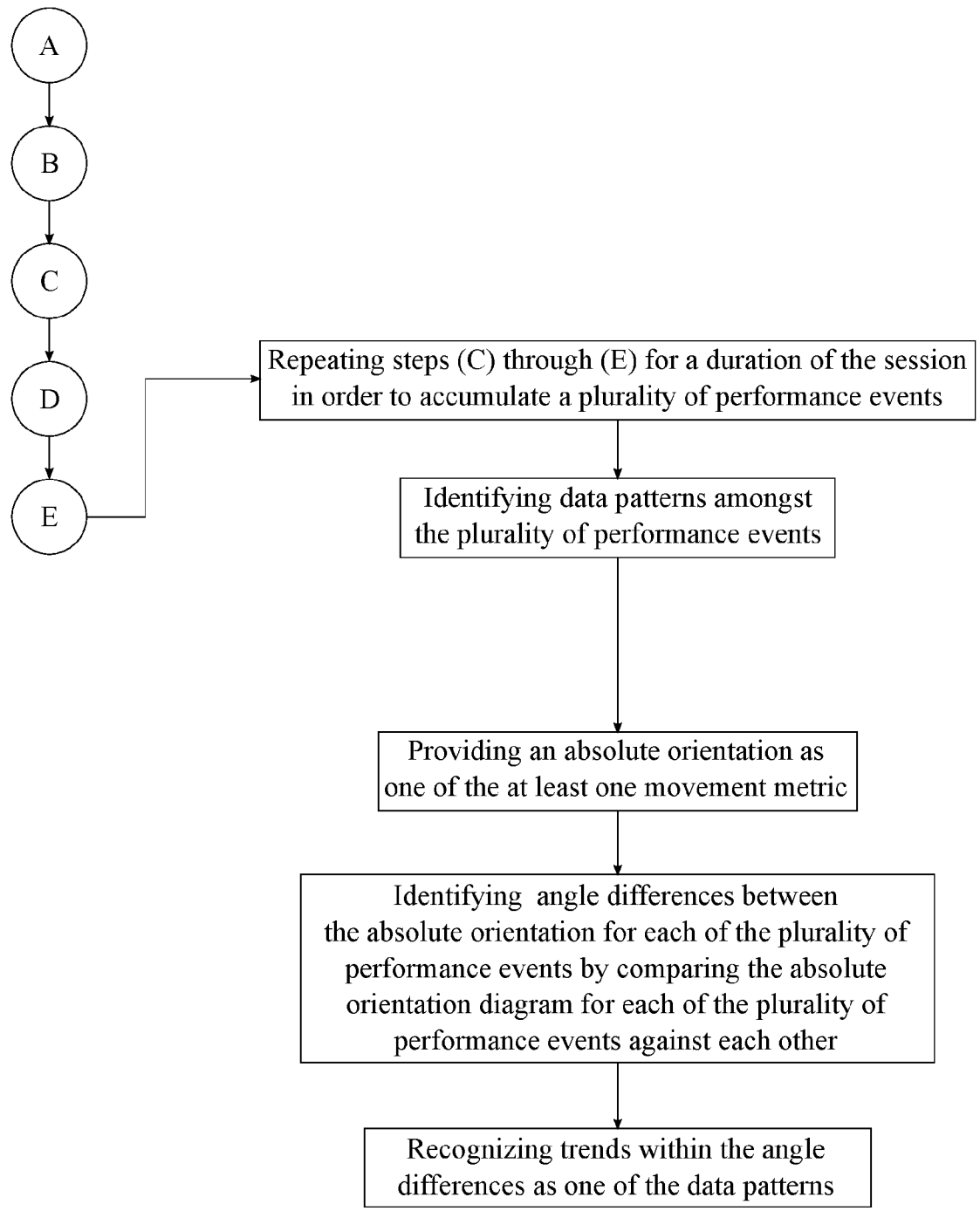
FIG. 14 is a flow chart of the general process of the present invention and identifying data patterns in relation to the angle differences.

As can be seen in FIG. 12-14, the present invention repeats the raw data collecting process, at least one movement metric for the cue-sport equipment calculating process, and performance event storing process for a duration of the session in order to accumulate a plurality of performance events. Then, the present invention is able to identify data patterns amongst the plurality of performance events through further analysis. The data patterns show the operator's progress for the duration of the session and can be a direct representation of the benefits and downsides of a training route or schedule. The data patterns are able to show selective outcomes of the present invention in relation to the travel trajectory, the impact force diagram, and the absolute orientation. More specifically, the present invention can identify trajectory differences between the travel trajectory for each of the plurality of performance events by comparing the travel trajectory for each of the plurality of performance events against each other. The present invention then recognizes trends within the trajectory differences as one of the data patterns and displays them to the operator. Further, the present invention can identify impact force differences between the impact force diagram for each of the plurality of performance events by comparing the impact force diagram for each of the plurality of performance events against each other. The present invention then recognizes trends within the impact force differences as one of the data patterns and displays them to the operator. Furthermore, the present invention can identify angle differences between the absolute orientation for each of the plurality of performance events by comparing the absolute orientation for each of the plurality of performance events against each other. Then, the present invention is able to recognize trends within the angle differences as one of the data patterns and display them to the operator. Furthermore, the present invention can generate total differences for each of the plurality of performance events by collectively comparing the travel trajectory, the impact force diagram, and the absolute orientation for each of the plurality of performance events against each other. Then, the present invention can recognize trends within the total differences as one of the data patterns and display them to the operator. Additionally, the trajectory differences, the impact force differences, the absolute orientation, and the total differences can be symbolically or numerically displayed to the operator upon system settings of the present invention.

Multiple systems may be optionally utilized in conjunction for multi-operator scenarios and to generate comparative data patterns. The system may be optionally connected to a cloud-based component, providing social media integration, competitive or collaborative play that is concurrent or time-shifted, and team or league interaction. The cloud-based component may optionally have a web-based user interface.

Although the invention has been explained in relation to its preferred embodiment, it is to be understood that many other possible modifications and variations can be made without departing from the spirit and scope of the invention as hereinafter claimed.

What is claimed is:

1. A method for providing feedback for cue-sport equipment during usage, the method comprising the steps of:
   (A) providing a first and second pieces of cue-sport equipment, positioning within each of the first and second pieces of cue-sport equipment, an inertial measurement sensor, a processor and a transceiver, wherein each of the inertial measurement sensors further include accelerometers, gyroscopes and magnetometers electrically connected together;
   (B) defining physical characteristics for each of the first and second pieces of cue-sport equipment;
   (C) collecting during a practice session, raw data from each of the inertial measurement sensors positioned within the first and second pieces of cue-sport equipment;
   (D) calculating from the collected raw data at least one movement metrics for each of the first and second cue-sport element; and
   (E) storing the at least one movement metrics from the first and second cue-sport equipment as a performance event within the practice session.

2. The method as in claim 1
   wherein the step of collecting of raw data further includes:
   collecting linear acceleration data, angular rate of rotation data and magnetometer data from the inertial measurement sensors during the practice session.

3. The method as in claim 1 comprising the steps of:
   positioning a portable power source within each of the first and second cue-sport equipment; and
   powering each of the inertial measurement sensors, the processor and the transceiver positioned within the first and second cue-sport equipment with the portable power source.

4. The method as in claim 3 comprising the steps of:
   positioning a wired or wireless charging module within each of the first and second cue-sport equipment; and
   recharging each portable power source with the wired or wireless charging module.

5. The method as in claim 1 comprising the steps of:
   providing a first external computing device in communication with the first and second cue-sport equipment;
   executing steps (C) through (E) with the processor positioned within each of the first and second cue-sport equipment;
   transmitting the collected raw data and the calculated at least one movement metrics from the processor to the first external computing device, wherein each of the transceivers communicably coupling each of the processors to the first external computing device; and
   displaying the at least one movement metrics from the first and second cue-sport equipment with the first external computing device.

6. The method as in claim 5 comprising the steps of:
   providing a second external computing device, the second external computing device communicably coupled with the first external computing device; and
   transmitting the collected raw data and the calculated at least one movement metrics from the first external computing device to the second external computing device.

7. The method as in claim 1 comprising the steps of:
   providing a first external computing device in communication with the first and second cue-sport equipment;
   executing step (C) with the processor positioned within each of the first and second cue-sport equipment;
   transmitting the collected raw data from the processor to the first external computing device, the transceiver communicably coupling the processor and the first external computing device;
   executing steps (D) and (E) with the processor positioned within each of the first and second cue-sport equipment; and
   displaying the at least one movement metrics from the first and second cue-sport equipment with the first external computing device.

8. The method as in claim 7 comprising the steps of:
providing a second external computing device, the second external computing device communicably coupled with the first external computing device; and
transmitting the collected raw data and the calculated at least one movement metrics from the first external computing device to the second external computing device.

9. The method as in claim 1 comprising the steps of:
providing a billiard ball as the first cue-sport equipment; and
calculating a travel trajectory for the billiard ball, wherein the travel trajectory is defined as one of the at least one movement metrics.

10. The method as in claim 1 comprising the steps of:
providing a billiard ball as the first cue-sport equipment; and
calculating an impact force diagram for the billiard ball, wherein the impact force diagram is defined as one of the at least one movement metrics.

11. The method as in claim 9 comprising the steps of:
providing a cue stick as the second cue-sport equipment; and
calculating a travel trajectory for the cue stick, wherein the travel trajectory is defined as one of the at least one movement metrics.

12. The method as in claim 1 comprising the steps of:
providing a cue stick as the first cue-sport equipment; and
calculating an impact force diagram for the cue stick, wherein the impact force diagram is defined as one of the at least one movement metrics.

13. The method as in claim 1 comprising the steps of:
repeating steps (C) through (E) for a duration of the practice session in order to accumulate a plurality of performance events for each of the first and second cue-sport equipment; and
identifying data patterns amongst the plurality of performance events.

14. The method as in claim 13 comprising the step of:
defining a travel trajectory as one of the at least one movement metrics for each of the first and second cue-sport equipment;
identifying trajectory differences between the travel trajectory for each of the plurality of performance events by comparing the travel trajectory for each of the plurality of performance events against each other; and
recognizing trends within the trajectory differences as one of the data patterns for each of the first and second cue-sport equipment.

15. The method as in claim 13 comprising the step of:
defining an impact force diagram as one of the at least one movement metrics for each of the first and second cue-sport equipment;
identifying impact force differences between the impact force diagram for each of the plurality of performance events by comparing the impact force diagram for each of the plurality of performance events against each other; and
recognizing trends within the impact force differences as one of the data patterns for each of the first and second cue-sport equipment.

16. The method as in claim 1 comprising the step of:
providing an acoustic sensor within the first and second cue-sport equipment, the acoustic sensor electrically connected to the processor and the transceiver;
collecting an impact sound signal from each acoustic sensor during the practice session;
transforming an impact data for the first and second cue-sport equipment from the impact sound signal; and
storing the impact data as the performance event during the practice session for the first and second cue-sport equipment.

17. The method as in claim 16 comprising the steps of:
positioning a portable power source within each of the first and second cue-sport equipment; and
powering each of the acoustic sensor, the inertial measurement sensors, the processor and the transceiver positioned within the first and second cue-sport equipment with the portable power source.

* * * * *